(12) United States Patent
Herwig

(10) Patent No.: US 11,447,716 B2
(45) Date of Patent: Sep. 20, 2022

(54) APPARATUS AND METHOD FOR ACQUIRING ESSENTIAL OILS

(71) Applicant: Mark Herwig, McMinnville, OR (US)

(72) Inventor: Mark Herwig, McMinnville, OR (US)

( * ) Notice: Subject to any disclaimer, the term of this patent is extended or adjusted under 35 U.S.C. 154(b) by 222 days.

(21) Appl. No.: 16/880,282

(22) Filed: May 21, 2020

(65) Prior Publication Data

US 2020/0277545 A1 Sep. 3, 2020

Related U.S. Application Data

(60) Provisional application No. 62/851,979, filed on May 23, 2019.

(51) Int. Cl.
| | |
|---|---|
| *B01D 1/28* | (2006.01) |
| *C11B 9/02* | (2006.01) |
| *B01D 11/04* | (2006.01) |
| B01D 39/04 | (2006.01) |

(52) U.S. Cl.
CPC .............. *C11B 9/025* (2013.01); *B01D 1/289* (2013.01); *B01D 11/0492* (2013.01); *B01D 39/04* (2013.01); *B01D 2201/0469* (2013.01)

(58) Field of Classification Search
CPC .............. B01D 11/0492; B01D 39/04; B01D 2201/0469
See application file for complete search history.

(56) References Cited

U.S. PATENT DOCUMENTS

| | | | | |
|---|---|---|---|---|
| 5,614,089 A | * | 3/1997 | Allington | ............ F16K 15/1823 |
| | | | | 210/659 |
| 2011/0306801 A1* | | 12/2011 | Schucker | .................. C02F 1/26 |
| | | | | 568/918 |
| 2016/0201009 A1* | | 7/2016 | Lopez | ...................... C11B 9/025 |
| | | | | 422/280 |
| 2016/0279535 A1* | | 9/2016 | Jones | .................... A61K 36/185 |
| 2017/0246558 A1* | | 8/2017 | James | ...................... C07C 45/79 |
| 2018/0099235 A1* | | 4/2018 | Joseph | ................. B01D 11/028 |
| 2020/0038777 A1* | | 2/2020 | Galyuk | .............. B01D 11/0288 |

FOREIGN PATENT DOCUMENTS

CN 108939614 A * 12/2018 ............. B01D 15/10

OTHER PUBLICATIONS

Li J—CN-108939614-A—Dec. 2018 (Year: 2018).*

* cited by examiner

*Primary Examiner* — Bradley R Spies

(57) ABSTRACT

A system and method for extracting essential oils is provided. One embodiment comprises an extractor assembly with an extractor cover, an extractor container, and an extractor assembly base, wherein the extractor container is secured between the extractor cover and the extractor assembly base during an extraction process; a bowl cover assembly with a collection bowl, and a bowl cover assembly base, wherein the collection bowl is secured between the extractor assembly base and the bowl cover assembly base during the extraction process; and a canister compression holder assembly, wherein a cannister containing a solvent is secured within the canister compression holder assembly during the extraction process. A solvent that is released from the cannister passes into the extractor container that contains matter that is to have essential oils extracted therefrom. The extracted oils exits the extractor assembly base into the collection bowl that collects the solvent with the essential oils.

18 Claims, 7 Drawing Sheets

APPARATUS AND METHOD FOR
ACQUIRING ESSENTIAL OILS

CLAIM OF PRIORITY

This application claims priority to copending U.S. provisional application entitled, "Systems and Methods for Removing Oils From Solubles," having Ser. No. 62/851,979, filed May 23, 2019, which is entirely incorporated herein by reference.

BACKGROUND OF THE INVENTION

Essential oils may denote a group of native substances which are obtainable from organic and/or inorganic material. For example, essential oils may include hydrocarbons, such as terpenes and the oxygenated compounds. Many essential oils that have applications in the food industry, the tobacco industry, the perfume industry, and the pharmaceutical industry. For example, essential oils are widely used as ingredients for fragrances, flavoring mixtures, and medicinal remedies. To put the essential oils in a usable form, the essential oils are extracted from the organic or inorganic materials.

The essential oils are obtained by extracting the oils from the organic materials and/or inorganic materials using an extraction processes. Legacy extraction processes may include steam distillation, solvent extraction, or mechanical separation or pressing of the essential oils from the plant material. For steam distillation, the essential oils may be separated or distilled by decantation of the essential oil from a steam distillate. For solvent extraction or mechanical separation or pressing, the essential oils may be filtered from a solvent or remnant materials using a filter.

The legacy afore-mentioned processes, however, may be inefficient, expensive, and degrade the organic and/or inorganic materials during the extraction process. In the case of steam distillation, the essential oils are usually contained only in minor quantities in the plant materials. The ratio of steam or water to the essential oil in the steam distillate is relatively large. A large amount of steam or water used for steam distillation of the essential oils causes problems in the subsequent phase of separating the essential oils from the steam or water. The difficulty in separating the essential oils from the water may cause a significant amount of essential oil to remain dissolved in the aqueous phase after the separation. Furthermore, the steam distillation process uses a relatively large volume of steam to extract the essential oils. The generation of the steam may be relatively expensive compared to the amount of essential oils extracted during the process.

In the case of solvent extraction or mechanical separation or pressing, solvents may be applied to the organic material and/or the inorganic material, the solvents may cause the organic material and/or inorganic material to deteriorate as the solvent breaks down the organic material and/or inorganic material to release the essential oils. For example, butane may be used in solvent extraction to extract compounds from essential oil material or cannabis plant to essentially create an essential oil or cannabis concentrate. The cannabis concentrate or butane hash oil (BHO) may be used for consumable cannabis concentrates, like shatter, wax, honey oil, nug run, and so on. The butane extraction may be a process of using a hydrocarbon like butane or propane as the solvent to extract cannabis concentrates. The butane extraction may provide a user with a low-cost and effective process for removing essential oils and/or cannabis concentrates. However, the solvent extraction process may create safety issues for a user because butane and/or other solvents may be flammable and create a fire and/or explosion during the solvent extraction process. For example, the solvent extraction process may include putting the organic material and the solvent under pressure in order to remove the concentrate. However, when the solvent is flammable and put under pressure the pressurized flammable material may explode and/or catch on fire. Additionally, the solvent may evaporate during the extraction process and create noxious fumes that cause a user or bystander to become sick or pass out.

In the arts of essential oils extraction there is a need in the arts for an improved methods, apparatus, and systems for extracting essential oils from organic materials and/or inorganic materials.

SUMMARY OF THE INVENTION

Embodiments of the essential oil extraction system provide a system and method for extracting essential oils. A system and method for extracting essential oils is provided. One embodiment comprises an extractor assembly with an extractor cover, an extractor container, and an extractor assembly base, wherein the extractor container is secured between the extractor cover and the extractor assembly base during an extraction process; a bowl cover assembly with a collection bowl, and a bowl cover assembly base, wherein the collection bowl is secured between the extractor assembly base and the bowl cover assembly base during the extraction process; and a canister compression holder assembly, wherein a cannister containing a solvent is secured within the canister compression holder assembly during the extraction process. A solvent that is released from the cannister passes into the extractor container that contains matter that is to have essential oils extracted therefrom. The extracted oils exits the extractor assembly base into the collection bowl that collects the solvent with the essential oils.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
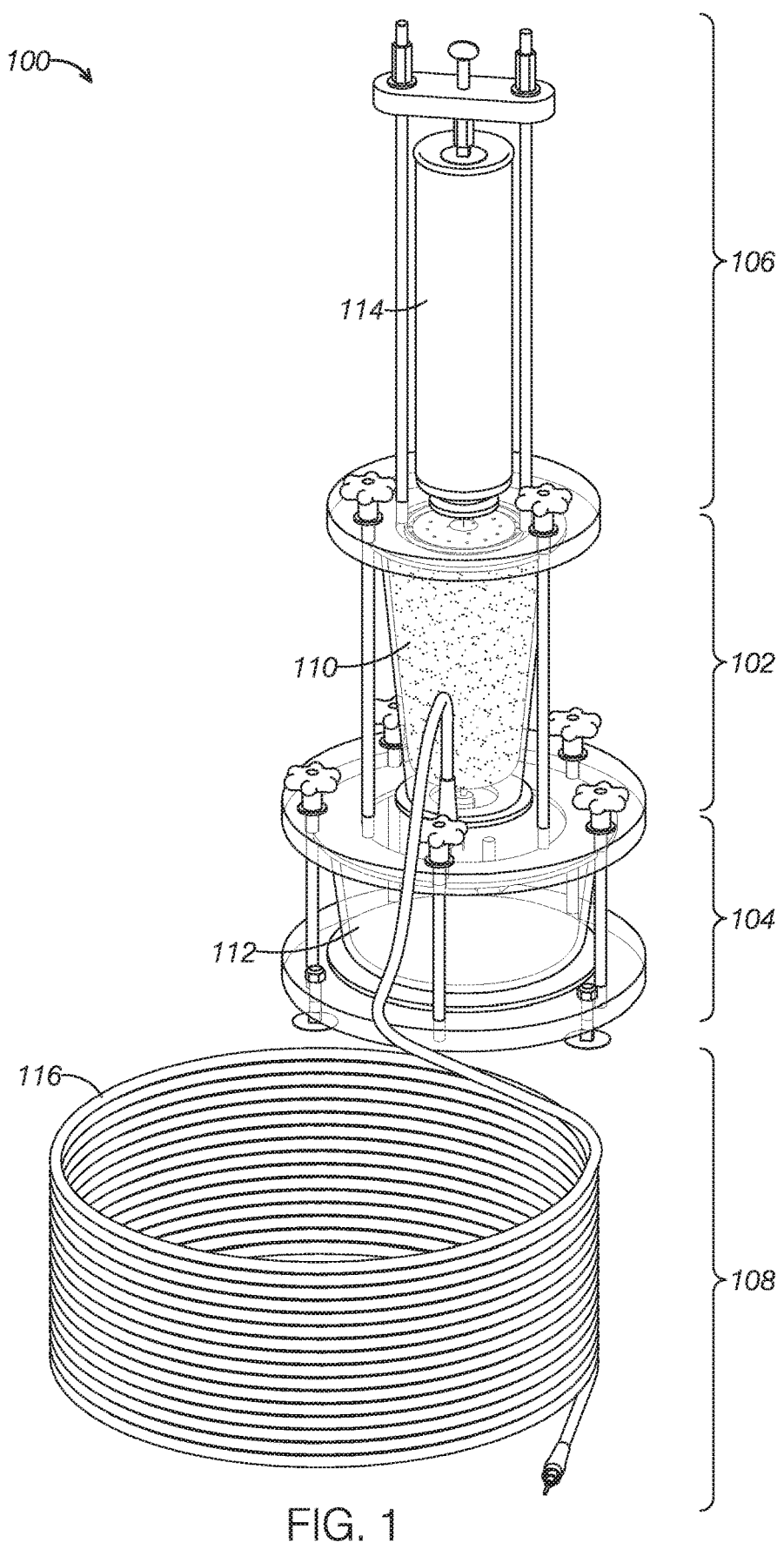
FIG. 1 illustrates an example embodiment of an essential oil extraction system.

FIG. 1 illustrates an example embodiment of an essential oil extraction system 100. Embodiments of the essential oil extraction system 100 comprises an extractor assembly 102, a bowl cover assembly 104, a canister compression holder assembly 106 and an exhaust hose assembly 108. The extractor assembly 102 secures an extractor container 110 that holds the organic material and/or the inorganic material during the extraction process. The bowl cover assembly 104 secures a collection bowl 112 in which extracted essential oils are collected during the extraction process. The canister compression holder assembly 106 compressibly secures a canister of solvent 114, which is operated to compress the canister 114 during the extraction process to release a solvent into the extractor container 110. The exhaust hose assembly 108 secures a hose 116 for venting solvent gasses during the extraction process. Preferably, a flow restrictor 118 is attached to the outlet end of the hose 116.

The disclosed systems and methods for removing essential oils from organic material and/or the inorganic material will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

The process of obtaining essential oils with embodiments of the essential oil extraction system 100 comprises three stages: an assembly stage, an extraction stage (interchangeably referred to herein as the extraction process), and a vacuum purge stage.

Throughout the following detailed description, a variety of examples for systems and methods to remove essential oils from organic material and/or the inorganic material are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Essential oils are native substances obtainable from organic materials and/or inorganic materials and are widely used as ingredients for fragrances, flavoring mixtures, and medicinal remedies. The essential oils may include hydrocarbons, such as terpenes and the oxygenated compounds. To put the essential oils in a usable form, the essential oils are extracted from the organic material and/or the inorganic material.

The essential oil extraction system 100 may provide a safe system to perform the solvent extraction process. The essential oil extraction system 100 may provide a system to extract essential oils (such as, but not limited to, cannabis oil) using a solvent extraction process without a user having to hold or operate any part of the essential oil extraction system 100 while in operation, where the essential oil extraction system 100 may perform the extraction process without user intervention or manual operation (i.e. an automated process).

Some embodiments of the essential oil extraction system 100 are relatively small in size, and accordingly, are ideal for use in a home or other small space. Other embodiments can be scaled to larger sizes to accommodate processing of larger quantities of organic materials and/or the inorganic materials.

An unexpected advantage of an example in-home use embodiment of the essential oil extraction system 100 may be that any individual can process their organic material and/or inorganic material at home in privacy. Another unexpected advantage of the essential oil extraction system 100 may be that there is no electric cooling and/or heating needed during the extraction process. Another unexpected advantage is that the in-home use embodiment of the essential oil extraction system 100 may process, for example, up to 3½ ounces of material during a single extraction process. Another advantage of the in-home use embodiment of the essential oil extraction system 100 is that a plurality of extraction processes using multiple solvent canisters may be performed before there is a need to change out the collector bowl. Another unexpected advantage of the essential oil extraction system 100 may be that components of the essential oil extraction system 100 may be made with polycarbonate and/or glass parts so that a user may view and monitor the extraction process. Another unexpected advantage of the essential oil extraction system 100 may be that the system includes an exhaust tube that the user may vent fumes from the solvent outside in a spark and flame-free environment. Another unexpected advantage of the essential oil extraction system 100 is the ease and speed of processing the separation of the plant constituents or essential oils (such as cannabis oil) from the non-solvent (such as non-butane) solubles like the Cellulose, sugars, and Chlorophyll.

In the various embodiments, a preferred solvent is a high grade organic butane. Butane is a gas at room temperature and atmospheric pressure. When pressurized, the butane is in liquid form. Accordingly, the solvent, when exiting the cannister, is in liquid form. As the liquid solvent passes through and interacts with the organic materials and/or the inorganic materials in the extractor container 110, essential oils are extracted. The liquid solvent and extracted oils are collected in the collection bowl 112. By controlling pressure within the extractor container 110 and the collection bowl 112 during the extraction process, the state of the solvent (liquid or gas) can be controlled in a novel manner. At the conclusion of the extraction process, gas solvent has been substantially removed from the collection bowl 112 such that the extracted essential oils remain. Any suitable solvent now known or later developed may be used for the extraction process.

The various disclosed essential oil extraction system 100 embodiments will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various essential oil extraction systems 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Figure 2:
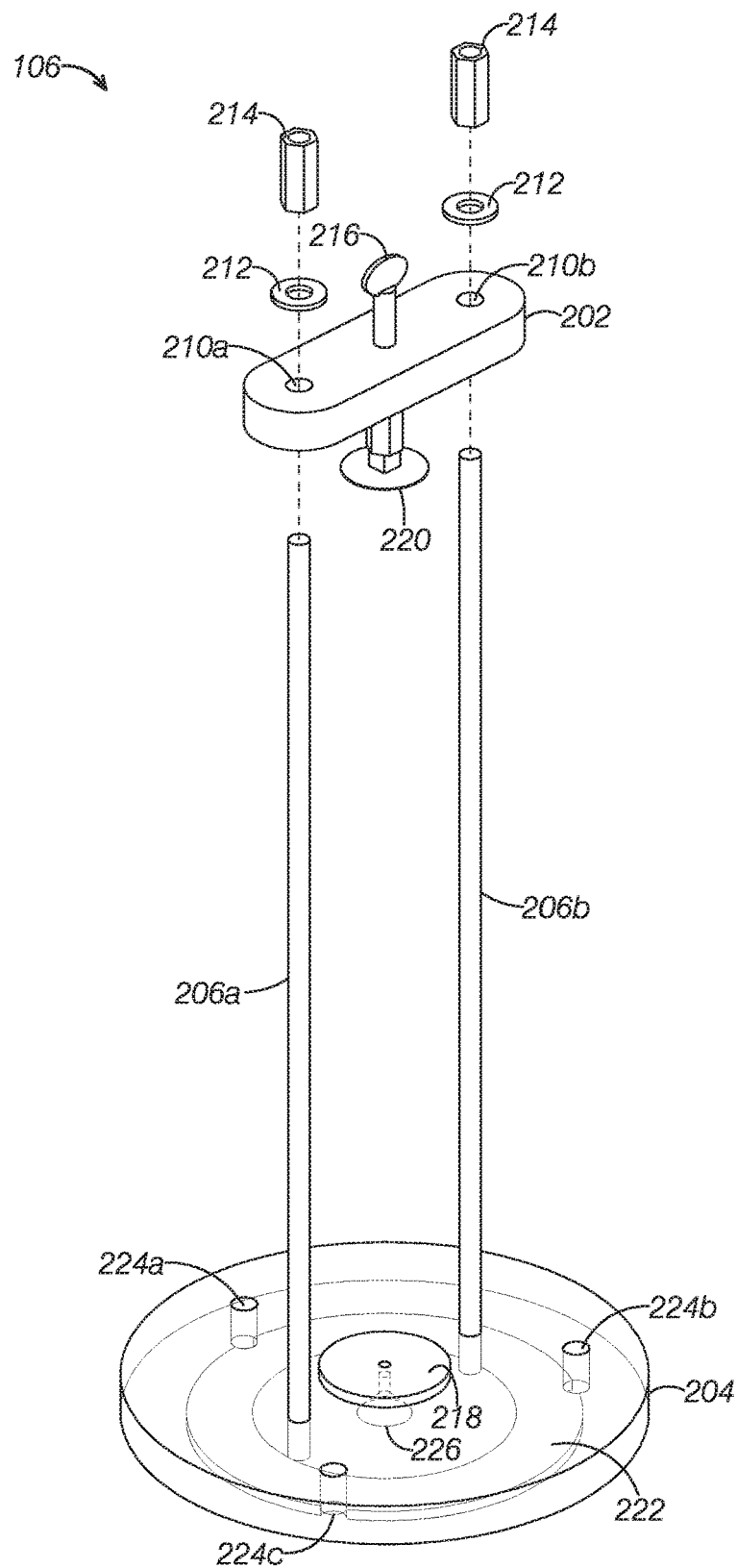
FIG. 2 is an exploded schematic view of an example canister compression holder assembly.

FIG. 2 is an exploded schematic view of an example canister compression holder assembly 106. The canister compression holder assembly 106 comprises a compression bar 202, an extractor cover 204, and a plurality of support rods 206a, 206b.

During the assembly stage, the lower ends of the support rods 206a. 206b are secured to the top of the extractor cover 204. In an example embodiment, glue, epoxy, or another suitable adhesive is used to secure the lower ends of the support rods 206a, 206b into drilled holes disposed in the top of the extractor cover 204. Alternatively, or additionally, the ends of the support rods 206a, 206b may be threaded so as to be screwed into mating threads of the holes disposed in the top of the extractor cover 204.

Alternatively, studs with optional internal threads may be secured to the top of the extractor cover. The studs would be configures to receive support rods 206a, 206b of different heights so as to be able to accommodate different sized cannisters 114. Adhesive may be optionally used to secure the two studs.

Preferably, the holes disposed in the top of the extractor cover 204 do not extend through the extractor cover 204 so that it is not possible for leakage of solvent back through the holes during the extraction process. Any suitable means of securing the support rods 206a, 206b to the extractor cover 204 may be used in the various embodiments.

In a preferred embodiment, the compression bar 202 is an elongated structure with rounded ends having the two through holes 210a. 210b through which the ends of the support rods 206a. 206b are passed through when securing the canister of solvent 114. The compression bar 202 may be any suitable size and/or shape. In some embodiments, more than two support rods 206 may be used to secure the canister of solvent 114. In such embodiments, multiple through holes 210 would extend through the compression bar 202 to receive the plurality of support rods 206.

Preferably, the opposing upper ends of the support rods 206a, 206b are threaded. In practice, a canister of solvent 114 is placed in position between the two example support rods 206a, 206b, with the outlet of the canister of solvent 114 oriented downward and over an aperture disposed in the top of the extractor cover 204. The example compression bar 202, having two apertures 210a, 210b extending there through, is then placed over the base canister of the canister of solvent 114 such that the ends of the support rods 206a, 206b are extended through the two apertures 210a, 210b, respectively. Preferably, an optional washer 212 is then placed over the ends of the support rods 206a, 206b.

In practice, finger nuts 214 are threaded over the threads of the ends of the support rods 206a. 206b. Any suitable threaded nut or other device may be used in alternative embodiments. The example finger nuts 214 are turned so as to move in a downward direction so that the bottom side of the compression bar 202 comes into contact with the bottom of the canister of solvent 114, thereby securing the canister of solvent 114 within the canister compression holder assembly 106.

Preferably, a compression means applies a downward force on the cannister 114 to release the solvent. In an example embodiment, a threaded elevator bolt 216 or the like extends through a similarly threaded aperture through the center of the compression bar 202. Preferably, the elevator bolt 216 has a flat base 220.

When the user turns the elevator bolt 216, the elevator bolt 216 screws downward to engage the base 220 with the bottom of the canister of solvent 114. Further turning of the elevator bolt 216 pushes the base 220 downward, thereby forcing the exhaust end of the canister 114 downwards so that the solvent, in liquid form, is released from the canister of solvent 114.

In a preferred embodiment, the top of the elevator bolt 216 includes outwardly extending "wings" that may be grasped by the user to turn the elevator bolt 216. However, alternative embodiments may employ other means to enable the user to turn the elevator bolt 216. For example, but not limited to, a crank handle means may be disposed on the top end of the elevator bolt 216. Alternatively, an electric motor may be operated by the user to turn the elevator bolt 216.

In a preferred embodiment, the aperture through the center of the compression bar 202 is threaded to facilitate rotation of the elevator bolt 216 for the downward movement of the base 220. Alternatively, a threaded nut having threads therein which match the threads of the elevator bolt 216 may be secured into the aperture through the center of the compression bar 202 using a suitable adhesive, glue, threads, or the like. Alternatively, the threads may be made during formation of the compression bar 202, such as during molding or by machining.

An upper gasket 218 may be optionally placed over the top of the extractor cover 204 prior to placing the canister of solvent 114 into the canister compression holder assembly 106. The upper gasket 218 has an aperture that is sized to permit the exhaust end of the canister of solvent 114 to engage with the top of the extractor cover 204 which has an aperture 226 extending there through. Accordingly, the solvent that is released from the canister of solvent 114 passes through the aperture 226 to enter into the extractor container 110 (FIG. 1). The upper gasket 218 forms a seal between the extractor container 110 and the top of the extractor cover 204 such that all released solvent enters into the extractor container 110. Alternative embodiments may use other sealing means to prevent solvent leakage.

Disposed underneath the extractor cover 204 is a lower gasket 222. As described in greater detail herein below, the lower gasket 222 is disposed between the bottom of the extractor cover 204 and the top of the extractor container 110. The extractor cover 204 further includes a plurality of through holes 224a, 224b, 224c used to secure the extractor container 110 to the bottom of the extractor cover 204. The lower gasket 222 then provides a seal between the bottom of the extractor cover 204 and the top of the extractor container 110 such that solvent and/or solvent gasses cannot escape from between the bottom of the extractor cover 204 and the top of the extractor container 110. Alternative embodiments may use other sealing means to prevent solvent leakage.

Figure 3:
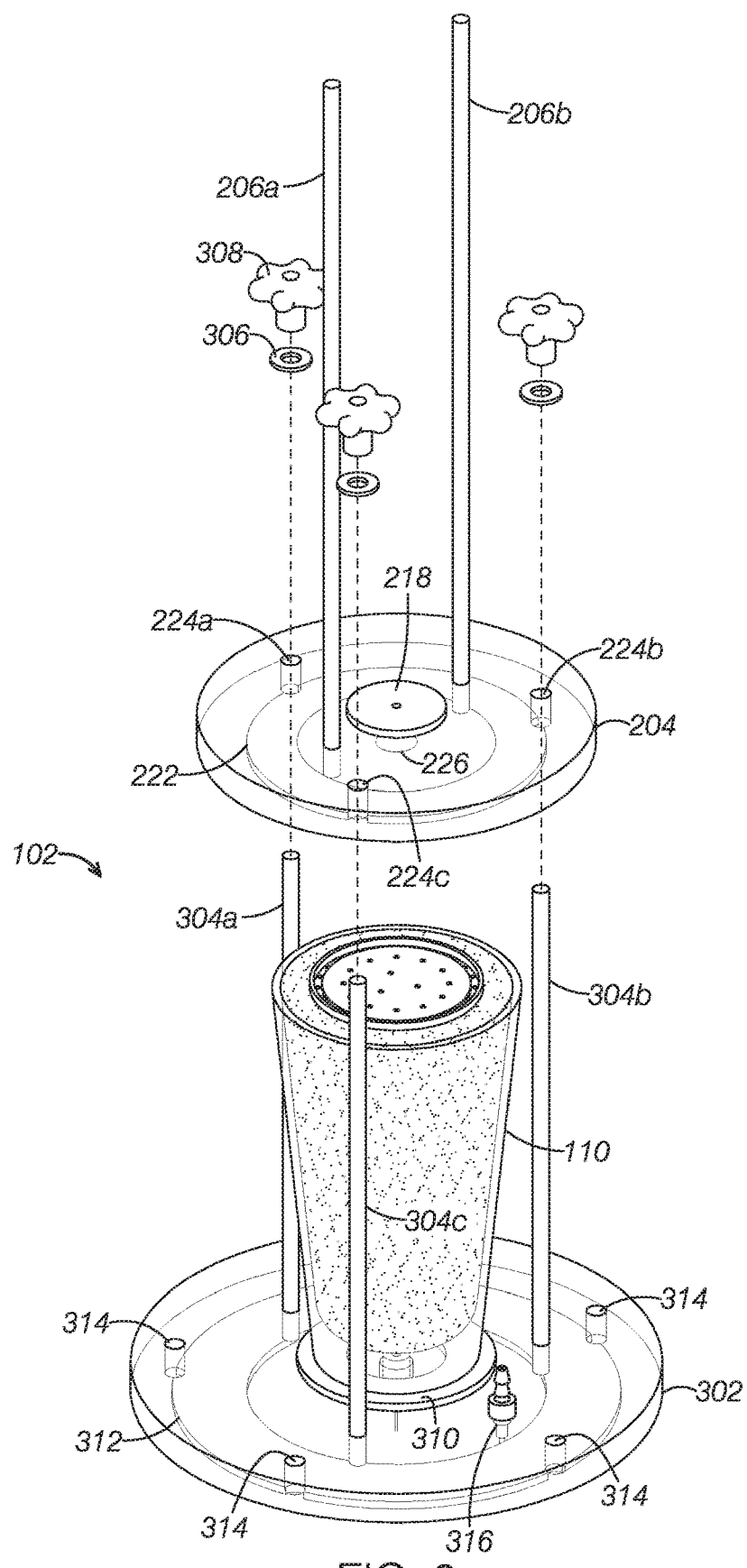
FIG. 3 illustrates an exploded schematic view of an example extractor assembly.

FIG. 3 illustrates an exploded schematic view of an example extractor assembly 102. The extractor assembly 102 comprises the extractor container 110, the extractor cover 204, an extractor assembly base 302, and support rods 304a. 304b, 304c.

During the assembly stage, the lower ends of the support rods 304a. 304b, 304c are secured to the top of the extractor assembly base 302. In an example embodiment, glue, epoxy, or other suitable adhesive is used to secure the lower ends of the support rods 304a, 304b, 304c into drilled holes disposed in the top of the extractor assembly base 302. Alternatively, or additionally, the ends of the support rods 304a, 304b, 304c may be threaded so as to be screwed into mating threads of the holes disposed in the top of the extractor assembly base 302. Preferably, the holes disposed in the top of the extractor assembly base 302 do not extend through the extractor assembly base 302 so that it is not possible for leakage of solvent and/or solvent gasses back through the holes during the extraction process. Any suitable means of securing the support rods 304a, 304b, 304c to the extractor assembly base 302 may be used in the various embodiments.

The opposing ends of the support rods 304a, 304b, 304c are preferably threaded. In practice, the extractor container 110 (filled with organic material and/or inorganic material) is placed in position between the three example support rods 304a. 304b, 304c as illustrated. The example extractor cover 204, having three apertures 224a, 224b, 224c, extending there through, is then placed over the extractor cover 204 such that the ends of the support rods 304a, 304b, 304c are extended through the three apertures 224a. 224b, 224c, respectively.

In a preferred embodiment, the length of the extractor container 110 is scalable to accommodate different sizes. For example, an embodiment may be provisioned with a plurality of different sized extractor containers 110. The user selects a particular extractor container 110 having a size that corresponds to the amount of the matter that is to have essential oils extracted therefrom. The support rods 304a, 304b, 304c are threaded so as to be able to accommodate the length of the selected extractor container 110.

A tightening means are coupled to the upper ends of each of the plurality of support rods 304a, 304b, 304c. When the tightening means are tightened, a compressive force is exerted between the extractor cover 204 and the extractor assembly base 302 such that the extractor container 110 is sealably secured between the extractor cover 204 and the extractor assembly base 304 during an extraction process. As defined herein, sealably secured means that a seal is established which prevents leakage of a liquid and/or a gas through the established seal.

An example tightening means comprises an optional washer 306 and tightening knobs 308. Each of the tightening knobs 308 have internal threads that match external threads disposed on the ends of the plurality of support rods 304a. 304b, 304c. The washer 306 is placed over the ends of the support rods 304a. 304b. 304c. Then, the tightening knobs 308 are threaded over the threads of the support rods 304a, 304b, 304c and are turned to exert a downward force on the top of the extractor cover 204 so as to move the extractor cover 204 in a downward direction such that the bottom of the extractor cover 204 comes into contact with the top of the extractor container 110. The lower gasket 222 then forms a seal as the tightening knobs 308 are further turned, thereby sealably securing the extractor container 110 within the extractor assembly 102.

Concurrently, as the tightening knobs 308 are turned, the downward force applied to the extractor container 110 engages the bottom of the extractor container 110 to sealably engage with the top of the extractor assembly base 302. An upper gasket 310 is disposed between the bottom of the extractor container 110 and the top of the extractor assembly base 302. This upper gasket 310 is compressed by the forces of the tightening of the knobs 308 to create a seal that prevents solvent and/or solvent gasses from escaping from the extractor container 110. Alternative embodiments may use other sealing means to prevent solvent leakage.

In alternative embodiments, the tightening means may employ a wing nut, a finger bolt, or the like that threads over the ends of the support rods 304a, 304b, 304c. Some embodiments may employ a crank or electric motor to generate the compressive force that secures the extractor container 110 between the bottom of the extractor container 110 and the top of the extractor assembly base 302.

Disposed underneath the extractor assembly base 302 is a lower gasket 312. As described in greater detail herein below, the lower gasket 312 is disposed between the bottom of the extractor assembly base 302 and the top rim of the collection bowl 112. The extractor assembly base 302 further includes a plurality of through holes 314 used to secure the extractor assembly 102 to the bowl cover assembly 104.

One skilled in the art appreciates that the canister compression holder assembly 106 and the extractor assembly 102 share parts in common, namely the extractor cover 204. In practice, the extractor container 110 may be secured within the extractor assembly 102 prior to securing the canister of solvent 114 in the canister compression holder assembly 106. Alternatively, the canister of solvent 114 may be secured within the canister compression holder assembly 106 prior to securing the extractor container 110 in the extractor assembly 102.

A leuer lock 316 is disposed in an aperture through the extractor assembly base 302. The leuer lock 316 provides a coupling means to secure the hose 116 (FIG. 1) to the top of the extractor assembly base 302, as described in greater detail herein below. Other coupling means may be used, such as compression fittings, conventional threaded fittings, cam and groove fittings, hydraulic fittings and couplings, pressure connectors and adaptors, and the like to secure the hose 116 to the top of the extractor assembly base 302.

Figure 4:
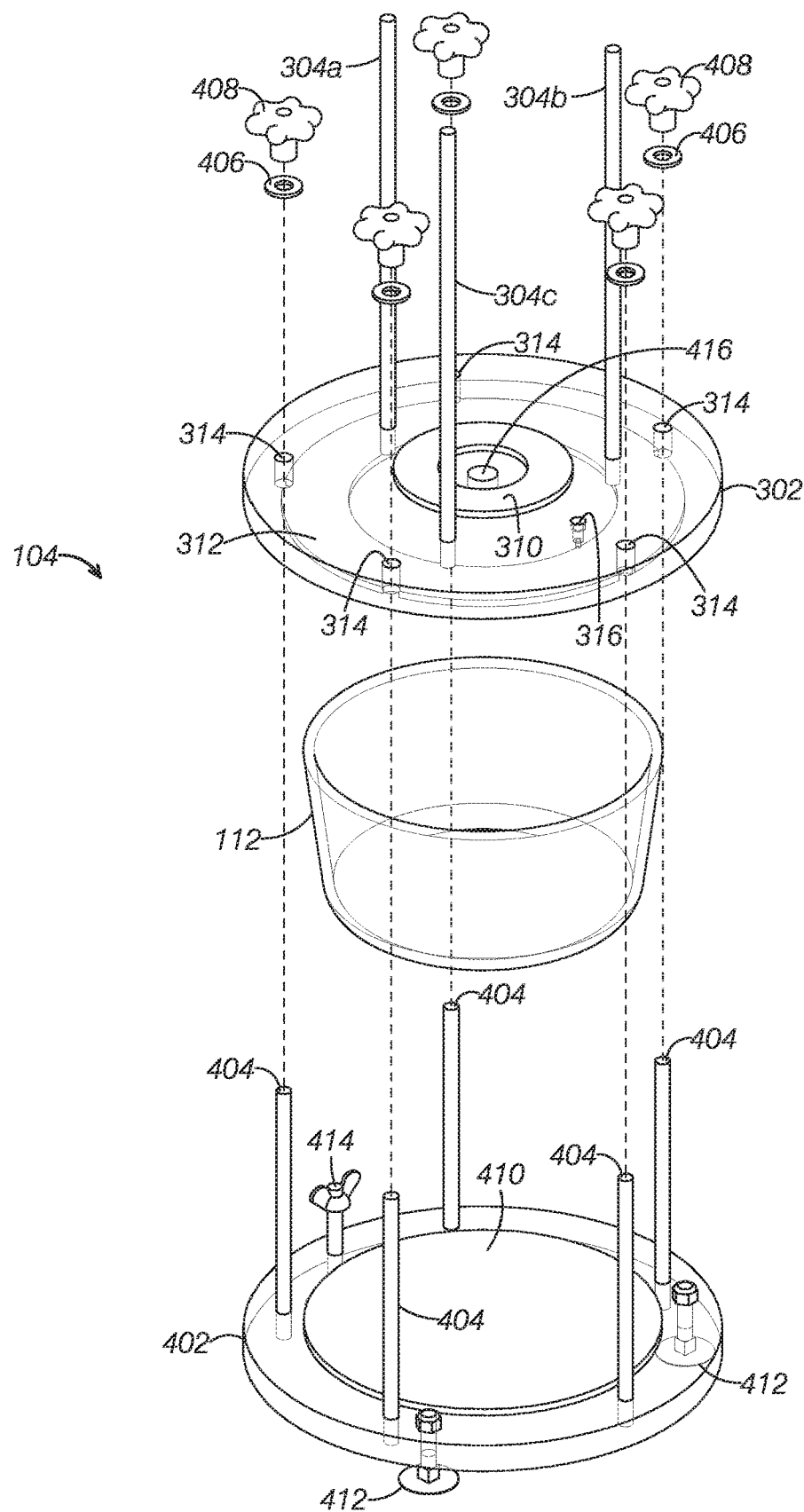
FIG. 4 illustrates an exploded schematic view of an example bowl cover assembly.

FIG. 4 illustrates an exploded schematic view of an example bowl cover assembly 104. The bowl cover assembly 104 comprises the extractor assembly base 302, a bowl cover assembly base 402, and a plurality of support rods 404. The example embodiment illustrated in FIG. 4 employs five support rods 404. Alternative embodiments may employ any suitable number of support rods 404.

During the assembly stage, the lower ends of the support rods 404 are secured to the top of the bowl cover assembly base 402. In an example embodiment, glue, epoxy, or other suitable adhesive is used to secure the ends of the support rods 404 into drilled holes disposed in the top of the bowl cover assembly base 402. Alternatively, or additionally, the ends of the support rods 404 may be threaded so as to be screwed into mating threads of the holes disposed in the top of the bowl cover assembly base 402. Any suitable means of securing the support 404 to the bowl cover assembly base 402 may be used in the various embodiments.

The opposing upper ends of the support rods 404 are preferably threaded. In practice, the collection bowl 112 is placed in position between the support rods 404 as illustrated. The extractor assembly base 302, having a corresponding plurality of apertures 314 extending there through, is then placed over the bowl cover assembly base 402 such that the ends of the support rods 404 are extended through the corresponding apertures 314. Preferably, an optional washer 406 is then placed over the ends of each of the support rods 404. Then, tightening knobs 408 are threaded over the threads of the support rods 404 and are turned so as to move the extractor assembly base 302 in a downward direction so that the bottom of the extractor assembly base 302 comes into contact with the top of the collection bowl 112. The lower gasket 312 then forms a seal as the tightening knobs 408 are further turned, thereby sealably securing the collection bowl 112 within bowl cover assembly 104.

A tightening means are coupled to the upper ends of each of the plurality of support rods 404. When the tightening means are tightened, a compressive force is exerted between the extractor assembly base 302 and the bowl cover assembly base 402 such that the collection bowl 112 is sealably secured between the extractor assembly base 304 and the bowl cover assembly base 402 during an extraction process.

An example tightening means comprises an optional washer 406 and tightening knobs 408. Each of the tightening knobs 408 have internal threads that match external threads disposed on the ends of the plurality of support rods 404. The washer 406 is placed over the ends of the support rods 404. Then, the tightening knobs 408 are threaded over the threads of the support rods 404 and are turned to exert a downward force on the top of the extractor assembly base 302 so as to move the extractor assembly base 302 in a downward direction such that the bottom of the extractor assembly base 302 comes into contact with the top rim of the collection bowl 112. The lower gasket 312 then forms a seal as the tightening knobs 408 are further turned, thereby sealably securing the collection bowl 112 within the bowl cover assembly 104.

Concurrently, as the tightening knobs 408 are turned, the downward force applied to the collection bowl 112 engages the bottom of the collection bowl 112 to securely engage with the top of the bowl cover assembly base 402. An optional rubber pad or mat 410 disposed between the bottom of the collection bowl 112 and the top of the bowl cover assembly base 402 is compressed to secure the collection bowl 112 within the bowl cover assembly 104.

In alternative embodiments, the tightening means may employ a wing nut, a finger bolt, or the like that threads over the ends of the support rods 404. Some embodiments may employ a crank or electric motor to generate the compressive force that secures the collection bowl 112 between the bottom of the extractor assembly base 302 and the top of the bowl cover assembly base 402.

A plurality of optional legs 412 may be secured to the bottom of the bowl cover assembly base 402. The ends of the legs 412 may have a non-slip pad or material such that during an extraction process, the essential oil extraction system 100 is less likely to slip or move on the surface that is supporting the essential oil extraction system 100. One or more of the legs 414 may be adjustable in height to enable the user to level the essential oil extraction system 100 on the surface that is supporting the essential oil extraction system 100. An optional threaded elevator bolt 216, turning knob 414, or the like extends through a similarly threaded aperture through the bowl cover assembly base 402 to enable the user to adjust the height of the corresponding leg 412 more conveniently.

One skilled in the art appreciates that the extractor assembly 102 and the bowl cover assembly 104 share parts in common, namely the extractor assembly base 302. In practice, the collection bowl 112 may be secured within the bowl cover assembly base 402 prior to securing the extractor container 110 in the canister extractor assembly 102. Alternatively, the extractor container 110 may be secured within the extractor assembly 102 prior to securing the collection bowl 112 in the bowl cover assembly 104.

An aperture 416 is disposed through the center of the bowl cover assembly base 402 to facilitate transport of the liquid solvent with the extracted essential oils from the extractor container 110 into the collection bowl 112 as described in greater detail herein below.

In a preferred embodiment, the compression bar 202, the extractor cover 204, the extractor assembly base 302, and the bowl cover assembly base 402 are fabricated using a transparent, or partially transparent, poly material (poly methyl methacrylate, or PMMA), such as Plexiglas, acrylic or the like. However, other embodiments may fabricate these components of the essential oil extraction system 100 using other suitable materials, such as metal or the like.

Figure 5:
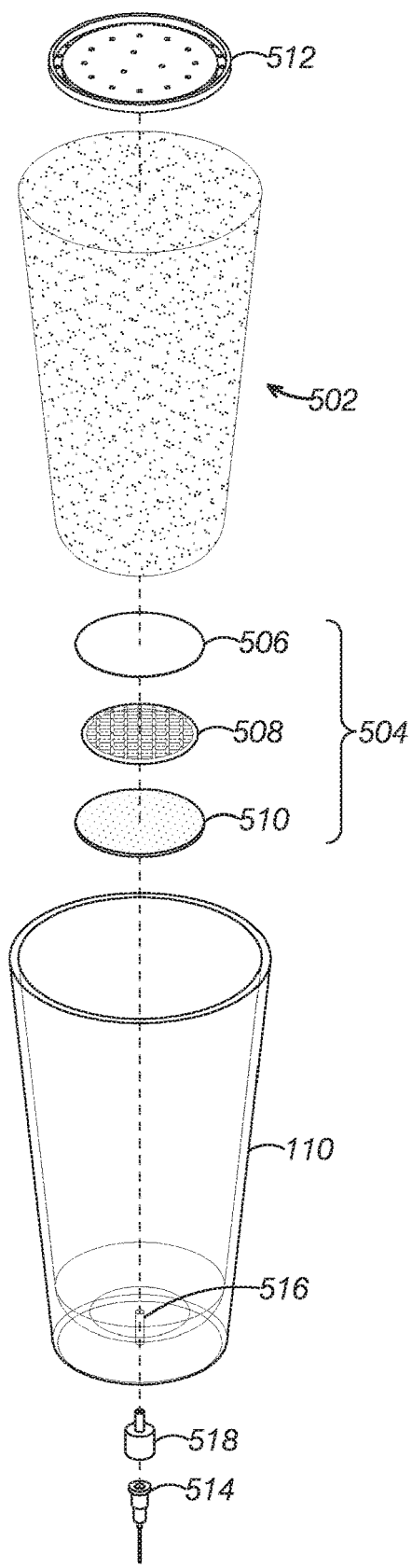
FIG. 5 illustrates an exploded schematic view of the organic material and/or the inorganic material that is placed into the example extractor container.

FIG. 5 illustrates an exploded schematic view of the organic material and/or the inorganic material 502 that is placed into the example extractor container 110. Prior to filling the extractor container 110 with the organic material and/or the inorganic material 502, a filtration subsystem 504 is placed into the bottom of the extractor container 110 to filter out particles of the organic material and/or the inorganic material 502 from entering into the collection bowl 112 during the extraction process. An example filtration subsystem 504 comprises a paper filter 506, a plastic screen 508 and a cotton fiber filter 510 arranged as illustrated in FIG. 5. These components 506, 508, 510 of the filtration subsystem 504 may be arranged in different order in alternative embodiments. In some alternative embodiments, one or more of these components 506, 508, 510 may be omitted, such as only a paper filter and then the cotton fiber filter. In some alternative embodiments, additional filtration components (not shown) may be added to the filtration subsystem 504. Any suitable filtration material may be used in the various embodiments. Once the filtration subsystem 504 is in place, the user may then fill the extractor container 110 with the organic material and/or the inorganic material 504.

Disposed above the organic material and/or the inorganic material is a solvent disperser 512. Preferably, the solvent disperser 512 is disk shaped, though any suitable shape may be used. The solvent disperser 512 is a structure having a plurality of spaced holes there through. Solvent dispersed from the canister of solvent 114 spreads over the top surface of the solvent disperser 512, and then passes though the apertures of the solvent disperser 512 so as to be more evenly dispersed over the top surface of the organic material and/or the inorganic material 502 residing in the extractor container 110. In some embodiments, the solvent disperser 512 is placed on top of the organic material and/or the inorganic material 502 prior to securing the extractor container 110 in the extractor assembly 102. Alternatively, the solvent disperser 512 may be secured to the bottom side of the extractor cover 204. Preferably, in such embodiments, the solvent disperser 512 can be removed from the bottom of the extractor cover 204 after use for cleaning.

Extending through an aperture 516 (hole) through the bottom of the extractor container 110 is a flow restrictor 514.

The flow restrictor 514 has a relatively small hole there through which permits flow of the solvent with extracted essential oil into the collection bowl 112. Additionally, the flow restrictor 514 maintains a back pressure within the extractor container 110 while the solvent is extracting the essential oils from the organic material and/or the inorganic material 502. By restricting or throttling back the flow of the solvent with extracted oils, the solvent is retained for a longer period of time and remains in its liquid state, thereby improving the efficiency of the extraction process. In an example embodiment, the flow restrictor 514 enables the extractor container 110 to become pressurized to approximately thirty five pounds per square inch (35 psi) during a portion of the extraction process. This pressure in the extractor container 110, along with gravity, facilitates the transfer of the liquid solvent with the extracted essential oils from the bottom of the extractor container 110 into the collection bowl 112.

In an example embodiment, the flow restrictor 514 may be a needle that is similar to the air needle used to fill a soccer ball. However, the inside hole diameter of the flow restrictor 514 is defined so as to maintain a target pressure within the extractor container 110 during the extraction process. In an example embodiment, the inside hole diameter is 0.05 inches, though any suitable inside hole diameter may be used. The diameter controls the rate of fluid flow and maintains back pressure within the extractor container 110 to maintain the solvent in a liquid state. In an example embodiment, one end of the needle is secured to a Leuer lock adaptor 518. The other end of the needle extends into the collection bowl 112. When the extraction process concludes, the user can see that there is no longer any fluid exiting the needle. Preferably, the flow restrictor 514 may be removed from the bottom of the extractor container 110 to facilitate cleaning and/or sanitizing after the extraction process has concluded.

Returning to FIG. 1 and FIG. 4, a Leuer lock 316 or other suitable hose coupling means is disposed in an aperture 416 (FIG. 4) through the extractor assembly base 302. The leuer lock 316 provides a coupling means to secure an end of the hose 116 (FIG. 1) to the top of the extractor assembly base 302. Here, a barbed Leuer lock adaptor is inserted into the end of the hose 116.

The hose 116 can be extended to a desired location for expelling solvent gas from the collection bowl 112. A flow restrictor 118 (FIG. 1) is disposed on the other end of the hose 116. Solvent gasses passing through the hose 116 exit into the ambient environment via the flow restrictor 118. Preferably, a diameter of the hole of the flow restrictor 118 is larger than the diameter of the hole of the flow restrictor 514 to facilitate maintenance of pressure in the extractor container 110 and the collection bowl 112. By slowing the movement of the exiting solvent gasses, the solvent remains within the extractor container 110 for a longer period of time, thereby increasing the efficiency of the extraction process.

Figure 6:
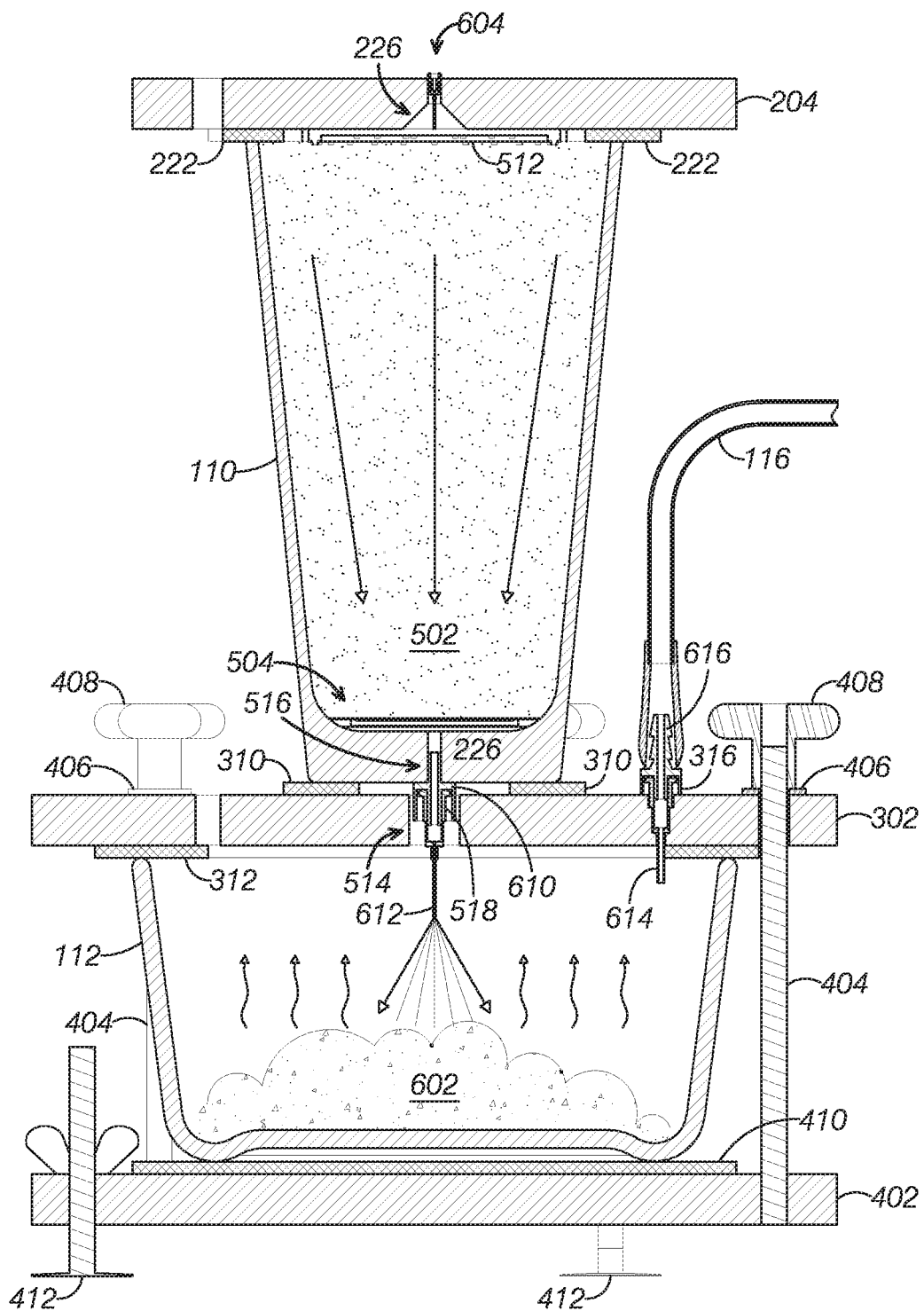
FIG. 6 is a cross sectional view of the extractor assembly coupled to the bowl cover assembly.

FIG. 6 is a cross sectional view of the extractor assembly 102 coupled to the bowl cover assembly 104. FIG. 6 conceptually illustrates the flow of solvent through the organic material and/or the inorganic material 502, and the flow of the solvent with the extracted liquids 602 into the collection bowl 112.

The aperture 226 disposed on the extractor cover 204 is configured to receive the nozzle outlet 604 of the canister of solvent 114 (FIG. 1). In a preferred embodiment, the aperture 226 enlarges as the aperture 226 approaches the bottom side of the extractor cover 204 to facilitate dispersal of the solvent being expelled by the canister of solvent 114. The solvent disperser 512 further distributes the solvent across the top of the organic material and/or the inorganic material 502. As the solvent travels downward through the organic material and/or the inorganic material 502 (as conceptually illustrated by the downward pointing arrows shown in the extractor container 110), essential oils are distilled out from the organic material and/or the inorganic material 502 by the solvent. The solvent containing the essential oils moves downward to exit the extractor container 110. The filtration subsystem 504 permits the fluid solvent with the extracted essential oils to pass there through into the collection bowl 112 while preventing any particulate matter from the organic material and/or the inorganic material 502 from entering into the collection bowl 112.

An aperture 516 extends through the bottom of the extractor container 110. In a preferred embodiment, the aperture 516 is threaded to mateably receive a threaded Leuer lock end 518 of the flow restrictor 514. An optional gasket 610 may be used to seal the flow restrictor 514 to the bottom of the extractor container 110. The liquid solvent with the extracted essential oils 602 exits the dispenser needle tip 612 of the flow restrictor 514 (as conceptually illustrated by the downward pointing arrows shown in the collection bowl 112). The liquid solvent with the extracted essential oils 602 is collected by the collection bowl 112. The threaded aperture 516 allows the user to remove the flow restrictor 514 after conclusion of the extraction process for cleaning and/or sanitizing. In alternative embodiments, the flow restrictor 514 may be secured to the extractor container 110 using a suitable adhesive.

Optionally, a spray diverter tube may be placed over the dispenser needle tip 612 to divert spray exiting the dispenser needle tip 612 into the collection bowl 112. In an example embodiment, the spray diverter tube is slipped over the protruding end of the flow restrictor 514 and over the dispenser needle tip 612, and is held in place by friction. Any suitable material may be used for the spray diverter tube, such as plastic or metal. Other securing means may be used. The length and the diameter of the spray diverter tube may be selected to provide desired spray dispersion characteristics. Preferably, the length of the spray diverter tube is longer than the dispenser needle tip 612.

One skilled in the art appreciates that if the pressure within the collection bowl 112 equalizes with the pressure within the extractor container 110, the flow of the liquid solvent with the extracted essential oils may be impeded. Accordingly, it is desirable for the pressure within the collection bowl 112 to be less than the pressure within the extractor container 110 during the extraction process. Accordingly, the leuer lock 316 disposed in the extractor assembly base 302 permits the flow of solvent gas to exit the collection bowl 112 via the hose 116 (as conceptually illustrated by the upward pointing arrows shown in the collection bowl 112), thereby keeping the pressure within the collection bowl 112 less than the pressure within the extractor container 110 during the extraction process.

In an alternative embodiment, an optional flow restrictor 614 at one end of the leuer lock 316 may be used to limit flow of the solvent gas and to maintain at least some level of pressure within the collection bowl 112. In some embodiments, the leuer lock 316 is removable to facilitate cleaning and/or sanitization after conclusion of the extraction process.

In a preferred embodiment, a hose attachment 616 is configured to be received by the leuer lock 316 to connect the hose 116 to the bowl cover assembly 104. In other embodiments, the hose 616 may be secured to the bowl cover assembly 104 using other connector devices.

Figure 7:
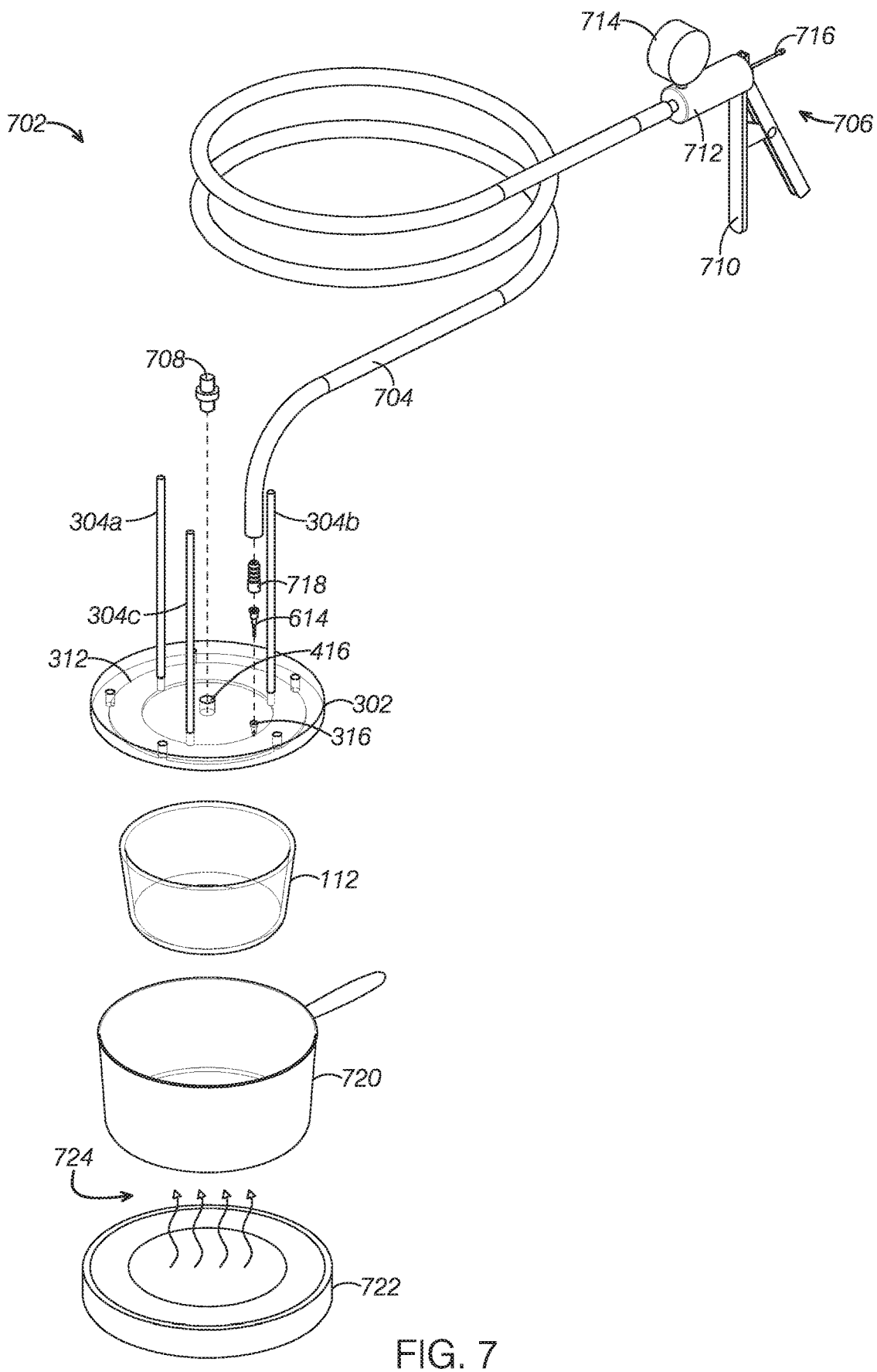
FIG. 7 illustrates an exploded schematic view of the extractor assembly base, the collection bowl and solvent gas extractor system.

FIG. 7 illustrates an exploded schematic view of the extractor assembly base 302, the collection bowl 112 and solvent extractor system 702. After completion of one or more extraction processes, one skilled in the art appreciates that some liquid solvent remains with the extracted essential oils 602 collected within the collection bowl 112. Accordingly, the contents of the collection bowl 112 requires further processing to remove all solvent from the extracted essential oils. The solvent extractor system 702, preferably coupled to the extractor assembly base 302, is used to perform a solvent purging process that removes the remaining solvents from the collected essential oils. In an alternative embodiment, another top plate with a sealing gasket and other features as described herein may be used instead of the preferred extractor assembly base 302.

The solvent extractor system 702 comprises a hose 704, a pump system 706, and an aperture plug 708. Preferably, the plug 708 will have a small hole therethrough.

In a preferred embodiment, the pump system 706 comprises a hand pump actuator 710, a vacuum chamber 712, an optional pressure gauge 714, and an exit valve 716. One end of the hose is coupled to the pump system 706. A hose attachment 616, similar to the above-described hose attachment 616, is coupled to the other end of the hose 704. In some embodiments, the hose 706 may be the same hose 116 that is used during the extraction process.

In practice, during the vacuum purge stage that occurs after a conclusion of the extraction process, the extractor assembly 102 and the bowl cover assembly 104 are disassembled or dismantled to remove the collection bowl 112. A barbed Leuer lock adaptor at the end of the hose 704 is attached to the leuer lock 316. Then, the extractor assembly base 302 is placed on top of the collection bowl 112. The gasket 312, or another suitable gasket, is disposed between the bottom of the extractor assembly base 302 and the top rim of the collection bowl 112. The aperture plug 708 is placed into the aperture 416 to provide a seal.

When a vacuum means, such as the hand pump actuator 710 is operated by the user, the pump system 706 creates a vacuum that is communicated into the interior of the collection bowl 112. The gasket 302 provides an air tight seal so that the vacuum within the collection bowl 112 is maintained. The small aperture in the plug 708 will slowly let in air into the collection bowl 112 when a vacuum is established. The flow of air facilitates venting of the solvent gasses out from the collection bowl 112.

Continued actuation of the hand pump actuator 710 increases the level of the vacuum. The user continues to actuate the hand pump actuator 710 until a desire vacuum level is reached, as indicated by the pressure gauge 714.

At this juncture in the solvent purging process, the vacuum securely couples the collection bowl 112 to the bottom of the extractor assembly base 302. The collection bowl 112 may then be placed in a suitable sauce pan 720. The sauce pan 702 is placed on a heat source 722, such as a burner, stove top, or the like. Heat 724 provided by the heat source 722 increases the temperature of the liquid solvent remaining in the collection bowl 112. The vacuum and the applied heat 720 cause any remaining liquid solvent to change to a gaseous state. The solvent gas then travels into the hose 704 to exit out of the exit valve 716. After some predefined duration, the user may conclude the solvent purging process and decouple the collection bowl 112 from the extractor assembly base 302 by releasing the vacuum.

The remaining essential oils, now solvent free, may then be removed from the collection bowl 112.

In alternative embodiments, any suitable pump system 706 may be used as the vacuum means. For example, but not limited to, an electric pump system may be used to create the vacuum.

The extractor assembly base 302 may be optionally fitted with a thermometer so that the user may monitor and regulate the temperature of the heated contents in the collection bowl 112. Alternatively, if the collection bowl 112 is clear, a thermometer may be placed inside the interior of the collection bowl 112 so as to be visible to the user.

It should be emphasized that the above-described embodiments of the essential oil extraction system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

The invention claimed is:

1. A essential oil extraction system, comprising:
    an extractor assembly, comprising:
        an extractor cover;
        an extractor container; and
        an extractor assembly base,
        wherein the extractor container is secured between the extractor cover and the extractor assembly base during an extraction process;
    a bowl cover assembly, comprising:
        a collection bowl; and
        a bowl cover assembly base,
        wherein the collection bowl is secured between the extractor assembly base and the bowl cover assembly base during the extraction process; and
    a canister compression holder assembly, wherein a cannister containing a solvent is secured within the canister compression holder assembly during the extraction process, wherein the solvent that is released from the cannister passes through a first aperture disposed through the extractor cover, and enters into the extractor container that contains matter that is to have essential oils extracted therefrom, wherein the solvent with the extracted oils exits the extractor assembly base through a second aperture disposed through the extractor assembly base into the collection bowl that collects the solvent with the essential oils, and wherein solvent gas exits out of the collection bowl via a third aperture disposed in the extractor assembly base.

2. The essential oil extraction system of claim 1, further comprising:

a first flow restrictor disposed in the first aperture extending through the extractor assembly extractor cover; and a second flow restrictor communicatively coupled to the first aperture extending through the extractor assembly base, wherein the first flow restrictor and the second flow restrictor cooperatively maintain a first pressure within the extractor container to maintain the solvent in a liquid state, and wherein the second flow restrictor maintains a second pressure within the collection bowl to allow the solvent to turn into a gas state.

3. The essential oil extraction system of claim 2, wherein the first flow restrictor has an exit that is defined by a first diameter, wherein the second flow restrictor has an exit defined by a second diameter, and where the second diameter is larger than the first diameter so that the first flow restrictor and the second flow restrictor cooperatively maintain the first pressure within the extractor container to maintain the solvent in the liquid state.

4. The essential oil extraction system of claim 3, further comprising:

a Leuer lock disposed in the third aperture extending through the extractor assembly base, wherein the Leuer lock couples a first end of a hose to the extractor assembly base, wherein the second flow restrictor is coupled to the second end of the hose, and wherein the solvent gas is released out to the ambient environment via the second flow restrictor.

5. The essential oil extraction system of claim 4, wherein the first flow restrictor comprises:

a Leuer lock disposed in the second aperture extending through the extractor assembly base, wherein the Leuer lock couples a bottom of the extractor container to the extractor assembly base, and wherein the first flow restrictor maintains the first pressure within the extractor container to maintain the solvent in a liquid state.

6. The essential oil extraction system of claim 5, wherein the first flow restrictor further comprises:

a needle tip that extends into the collection bowl, wherein the needle tip slows flow of the solvent and essential oils into the collection bowl.

7. The essential oil extraction system of claim 1, wherein the extractor assembly further comprises:

a plurality of support rods; and a tightening means, wherein a lower end of each one of the plurality of support rods are affixed to a top side of the extractor assembly base, wherein the opposing upper ends of the support rods extend through corresponding apertures disposed through the extractor cover, and wherein the tightening means coupled to the upper ends of each of the plurality of support rods, when tightened, exert a compressive force between the extractor cover and the extractor assembly base such that the extractor container is sealably secured between the extractor cover and the extractor assembly base during the extraction process.

8. The essential oil extraction system of claim 7, wherein the tightening means comprises:

a plurality of tightening knobs each with internal threads that match external threads disposed on the ends of the plurality of support rods, wherein when each one of the plurality of tightening knobs are threaded onto the end of a corresponding one of the plurality of support rods such that when the tightening knobs are turned, a downward force is applied onto the top of the extractor cover to sealably secure the collection bowl between the extractor cover and the extractor assembly base.

9. The essential oil extraction system of claim 1, wherein the extractor assembly comprises:

a first gasket disposed between a bottom side of the extractor cover and a top of the extractor container; and a second gasket disposed between a top of the extractor assembly base and a bottom of the extractor container, wherein when the extractor container is sealably secured within the extractor assembly, the first gasket forms a seal between the bottom side of the extractor cover and the top of the extractor container to prevent solvent leakage, and the second gasket forms a seal between the top of the extractor assembly base and the bottom of the extractor assembly base to prevent solvent leakage.

10. The essential oil extraction system of claim 1, wherein the bowl cover assembly further comprises:

a plurality of support rods; and a tightening means, wherein a lower end of each one of the plurality of support rods are affixed to a top side of the bowl cover assembly base, wherein the opposing upper ends of the support rods extend through corresponding apertures disposed through the extractor assembly base, and wherein the tightening means coupled to the upper ends of each of the plurality of support rods, when tightened, exert a compressive force between the extractor assembly base and the bowl cover assembly base such that the collection bowl is sealably secured between the extractor assembly base and the bowl cover assembly base during the extraction process.

11. The essential oil extraction system of claim 10, wherein the tightening means comprises:

a plurality of tightening knobs each with internal threads that match external threads disposed on the ends of the plurality of support rods, wherein when each one of the plurality of tightening knobs are threaded onto the end of a corresponding one of the plurality of support rods such that when the tightening knobs are turned, a downward force is applied onto the top of the extractor cover to sealably secure the collection bowl between the extractor cover and the extractor assembly base.

12. The essential oil extraction system of claim 1, wherein the bowl cover assembly comprises:
- a gasket disposed between a bottom side of the extractor assembly base and a top rim of the collection bowl,
- wherein when the collection bowl is sealably secured within the bowl cover assembly, the first gasket forms a seal between the bottom side of the extractor assembly base and the top rim of the collection bowl to prevent solvent leakage.

13. The essential oil extraction system of claim 1, wherein the canister compression holder assembly comprises:
- a compression bar with a first aperture, a second aperture, and a third aperture;
- a first support rod;
- a second support rod;
- a first attachment means;
- a second attachment means, and
- a compression means,
- wherein a lower end of the first support rod and the second support rod are affixed to a top side of the extractor cover,
- wherein the opposing upper ends of the first support rod and the second support rod extend through corresponding apertures disposed through the compressor bar, and
- wherein the first attachment means is coupled to the upper end of the first support rod and the second attachment means is coupled to the upper end of the second support rod after the cannister is placed within the canister compression holder assembly,
- wherein when the first attachment means and the second attachment means are tightened, the compression bar exerts a force onto the bottom of the cannister so that the cannister is secured between the compression bar and the extractor cover during the extraction process,
- wherein the compression means is disposed through the third aperture of the compression bar, and
- wherein when the compression means is actuated, the compression means exerts a further force onto the bottom of the cannister so that the solvent is released from the cannister into the extractor container.

14. The essential oil extraction system of claim 1, wherein the canister compression holder assembly comprises:
- a gasket disposed between a top side of the extractor cover and an exhaust end of the cannister; and
- wherein when the cannister is secured within the canister compression holder assembly, the gasket forms a seal between the top side of the extractor cover and the exhaust end of the cannister to prevent solvent leakage.

15. The essential oil extraction system of claim 1, further comprising:
- an exhaust hose assembly that creates a vacuum within the collection bowl after completion of the extraction process,
- wherein the exhaust hose assembly comprises:
  - a hose with a first end that is connected to an aperture disposed through the extractor assembly base;
  - a plug that is fitted into the aperture in the extractor assembly base, and
  - a vacuum means coupled to a second end of the hose,
- wherein after a conclusion of the extraction process, the extractor assembly and the bowl cover assembly are dismantled to remove the collection bowl,
- wherein after the dismantling, a bottom of the extractor assembly base is placed over a top rim of the collection bowl,
- wherein in response to operating the vacuum means, a vacuum is formed within the collection bowl such that the collection bowl is sealably retained to the bottom of the extractor assembly base; and
- wherein in response to maintaining the vacuum within the collection bowl, liquid solvent within the collection bowl is converted into a solvent gas by the vacuum and is vented out through the hose.

16. The essential oil extraction system of claim 15, wherein the bottom of the collection bowl that has been secured to the bottom of the extractor assembly base is placed in a sauce pan with water therein, and wherein in heat applied to the sauce pan to heat the water then heats the contents of the collection bowl such that any liquid solvent within the collection bowl is converted into a solvent gas by the heat and is vented out through the hose.

17. The essential oil extraction system of claim 1, further comprising:
- a filtration subsystem disposed between the bottom of the extractor container and the matter that is to have essential oils extracted therefrom, wherein the filtration system comprises:
  - a paper filter;
  - a plastic screen; and
  - a cotton fiber filter,
- wherein the paper filter is disposed between the matter that is to have essential oils extracted therefrom and the plastic screen,
- wherein the plastic screen is disposed between the paper filter and the cotton fiber filter, and
- wherein the cotton fiber filter is disposed between the plastic screen and a bottom of the extractor container.

18. The essential oil extraction system of claim 1, further comprising:
- a dispersion plate having a plurality of apertures,
- wherein the dispersion plate is disposed between the top of the extractor container and the matter that is to have essential oils extracted therefrom, and
- wherein when the solvent in liquid form is released from the cannister, the solvent is more evenly dispersed across a surface of the matter that is to have essential oils extracted therefrom.

* * * * *